United States Patent
Matsushita et al.

(10) Patent No.: US 11,534,689 B2
(45) Date of Patent: Dec. 27, 2022

(54) PROCESSING SYSTEM, COMPUTER-READABLE NON-TRANSITORY STORAGE MEDIUM HAVING STORED THEREIN PROCESSING PROGRAM, PROCESSING APPARATUS, AND PROCESSING METHOD

(71) Applicant: NINTENDO CO., LTD., Kyoto (JP)

(72) Inventors: Shingo Matsushita, Kyoto (JP); Yuji Ohashi, Kyoto (JP); Kouhei Maeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 247 days.

(21) Appl. No.: 17/120,752

(22) Filed: Dec. 14, 2020

(65) Prior Publication Data
US 2021/0228985 A1 Jul. 29, 2021

(30) Foreign Application Priority Data
Jan. 29, 2020 (JP) .............................. JP2020-012715

(51) Int. Cl.
*A63F 13/52* (2014.01)
*A63F 13/533* (2014.01)
(Continued)

(52) U.S. Cl.
CPC ............ *A63F 13/52* (2014.09); *A63F 13/533* (2014.09); *G06T 11/60* (2013.01); *A63F 13/537* (2014.09);
(Continued)

(58) Field of Classification Search
CPC ...... A63F 13/52; A63F 13/533; A63F 13/537; A63F 13/792; A63F 2300/303; A63F 2300/308; A63F 2300/5513; G06T 11/60
See application file for complete search history.

(56) References Cited

U.S. PATENT DOCUMENTS

| 9,373,226 B1 * | 6/2016 | Henrick ............... G07F 17/3255 |
| 2004/0127272 A1 * | 7/2004 | Park ........................ A63F 13/35 463/6 |

(Continued)

OTHER PUBLICATIONS

Nintendo Co., Ltd.,"Fire Emblem Heroes", [online], [searched on Jan. 15, 2020], Internet (URL: https://fire-emblemheroes.coms/ja/system/) with Corresponding English URL (URL : https://fire-emblemheroes.com/en/system/), 6 pages.
(Continued)

*Primary Examiner* — Werner G Garner
(74) *Attorney, Agent, or Firm* — Nixon & Vanderhye PC

(57) ABSTRACT

A plurality of characters with which outer appearance images and game parameters are respectively associated, even several characters having the same outer appearance images are individually managed, and a game is executed using the plurality of characters possessed by a user. For a specific character designated by the user among specific characters for which a change allowing condition for the outer appearance image is satisfied, the outer appearance image is changed to a first image set in advance in association with the specific character or a second image that has become selectable by the change allowing condition being satisfied, on the basis of a user's instruction. Further, the game parameters of all the specific characters for which the change allowing condition is satisfied are changed.

7 Claims, 13 Drawing Sheets

(51) Int. Cl.
*G06T 11/60* (2006.01)
*A63F 13/537* (2014.01)
*A63F 13/792* (2014.01)

(52) U.S. Cl.
CPC ....... *A63F 13/792* (2014.09); *A63F 2300/303* (2013.01); *A63F 2300/308* (2013.01); *A63F 2300/5513* (2013.01)

(56) References Cited

U.S. PATENT DOCUMENTS

| | | | | |
|---|---|---|---|---|
| 2016/0314609 | A1* | 10/2016 | Taylor | A63F 13/65 |
| 2019/0275429 | A1* | 9/2019 | Yang | A63F 13/50 |
| 2020/0410575 | A1* | 12/2020 | Grantham | G06Q 30/0241 |

OTHER PUBLICATIONS

Nintendo Co., Ltd., "Fire Emblem Heroes", [online], [searched on Jan. 15, 2020] Internet (URL : https://fire-emblem-heroes.com/ja/system/) with corresponding English-language URL (URL: https://fire-emblem-heroes.com/en/system/), 6 pages.

* cited by examiner

| CHARACTER ID | BASIC PARAMETER INFORMATION | BASIC IMAGE DATA |
|---|---|---|
| 0001 | ..... | .... |
| 0002 | ..... | .... |
| 0003 | ..... | .... |
| 0004 | ..... | .... |

| COSTUME ID | CORRESPONDING CHARACTER ID | CHANGE VALUE INFORMATION | COSTUME IMAGE DATA |
|---|---|---|---|
| 0100 | 0010 | .... | .... |
| 0101 | 0015 | .... | .... |
| 0102 | 0050 | .... | .... |
| 0103 | 0075 | .... | .... |

405

531 USER ID
532 SIGN-UP STATE DATA
533 POSSESSED CHARACTER DATA
534 POSSESSED SKIN DATA
535 PROGRESS STATE DATA

⋮

533

| 551 | 552 | 553 | 554 | 555 |
|---|---|---|---|---|
| POSSESSION NUMBER | CHARACTER ID | LEVEL INFORMATION | PRESENT OUTER APPEARANCE INFORMATION | PARAMETER CHANGE FLAG |
| 0001 | 0010 | Lv1 | NORMAL | OFF |
| 0002 | 0010 | Lv3 | NORMAL | OFF |
| 0003 | 0075 | Lv5 | COSTUME SKIN | ON |
| 0004 | 0075 | Lv1 | NORMAL | ON |
| ⋮ | ⋮ | ⋮ | ⋮ | ⋮ |

PROCESSING SYSTEM, COMPUTER-READABLE NON-TRANSITORY STORAGE MEDIUM HAVING STORED THEREIN PROCESSING PROGRAM, PROCESSING APPARATUS, AND PROCESSING METHOD

CROSS REFERENCE TO RELATED APPLICATION

This application claims priority to Japanese Patent Application No. 2020-012715 filed on Jan. 29, 2020, the entire contents of which are incorporated herein by reference.

FIELD

The exemplary embodiments relate to a game process for progressing a game using a plurality of characters possessed by a user.

BACKGROUND AND SUMMARY

Conventionally, there has been known a game in which an image representing the outer appearance of a character and a parameter used in the game are associated with a predetermined character. In addition, there has also been known a game in which a user possesses a plurality of such characters and the game is progressed using these characters.

For each character appearing in the game as described above, its outer appearance image and parameters indicating a strength in a battle and the like are associated. Thus, each character is imparted with an individuality, so that the user can readily have an attachment to each character. In this regard, there has been room for improvement in changing various types of information (outer appearance image and parameter) associated with such a character in order to further enhance amusement of the game.

Accordingly, an object of the exemplary embodiments is to provide a processing system, a computer-readable non-transitory storage medium having stored therein a processing program, a processing apparatus, and a processing method that can increase the degree of freedom for a user in changing various types of information associated with characters.

Configuration examples for achieving the above object will be shown below.

One configuration example is a processing system including at least one processor, the at least one processor included in the processing system executing, alone or in coordination, the following processing. A plurality of characters which are possessed by a user and with which outer appearance images representing outer appearances and game parameters used in a game are respectively associated, are managed, and even when a plurality of characters for which a same outer appearance image is set are included in the plurality of characters, the plurality of characters having the same outer appearance image are individually managed. The game is executed using at least any of the plurality of characters possessed by the user. For a specific character designated by the user among specific characters for which a change allowing condition for changing the outer appearance image is satisfied among the plurality of characters possessed by the user, whether to apply a first image set in advance in association with the specific character or a second image that has become selectable by the change allowing condition being satisfied, is selected on the basis of an instruction from the user, and the outer appearance images of all the designated specific characters that are possessed, are changed to the selected image. When the change allowing condition is satisfied for any of the characters, the game parameters of all the specific characters for which the change allowing condition is satisfied among the characters possessed by the user, are changed. A basic parameter that is used as the game parameter and varies in accordance with a progress state of the game, is set in advance for each of the characters. In changing the game parameter, a value is added to the basic parameters of all the possessed specific characters irrespective of the progress state of the game. After the change allowing condition is satisfied, the outer appearance image of the specific character for which the change allowing condition is satisfied, is allowed to be optionally changed to the first image or the second image. The game parameter is not changed between when the outer appearance image of the specific character is the first image and when the outer appearance image of the specific character is the second image.

According to the above configuration example, when a predetermined condition is satisfied, the outer appearances of all the plurality of characters for which the same outer appearance image is set are allowed to be changed, and the game parameters of the characters can be changed. Further, regardless of whether or not the outer appearance of the character is thereafter changed, the above parameter change can be maintained. Thus, the degree of freedom in changing various types of information associated with the characters can be improved. In addition, the user can freely change the outer appearance images of the characters without caring about the game parameters, so that the degree of freedom in changing the outer appearances can be enhanced.

In another configuration example, among the specific characters, the outer appearance image of the character that has been possessed by the user since before the change allowing condition is satisfied may be also changed. Further, among the specific characters, the game parameter of the character that has been possessed by the user since before the change allowing condition is satisfied may be also changed.

According to the above configuration example, in the case where a change allowing condition is newly set for a character that has been already possessed, the user can be motivated to satisfy the newly set change allowing condition.

In another configuration example, among the specific characters, the outer appearance image of the character newly acquired by the user after the change allowing condition is satisfied may be also changed. Further, among the specific characters, the game parameter of the character newly acquired by the user after the change allowing condition is satisfied may be also changed.

In another configuration example, the processor may give a predetermined number of the specific characters to the user when the change allowing condition is satisfied.

According to the above configuration example, even if the user does not possess the character for which the outer appearance has become changeable, it is possible to give the character itself to the user. Thus, it is possible to immediately provide the user with an occasion for trying to change the outer appearance, by satisfying the change allowing condition.

According to the exemplary embodiments, when a predetermined condition is satisfied, the outer appearance of a predetermined character is allowed to be freely changed. Further, when the above condition is satisfied, the game parameter of the character can be changed, and regardless of whether or not the outer appearance is thereafter changed, the parameter change can be maintained. Thus, it is possible to improve the degree of freedom for the user to change various types of information associated with characters.

DETAILED DESCRIPTION OF NON-LIMITING EXAMPLE EMBODIMENTS

Figure 1:
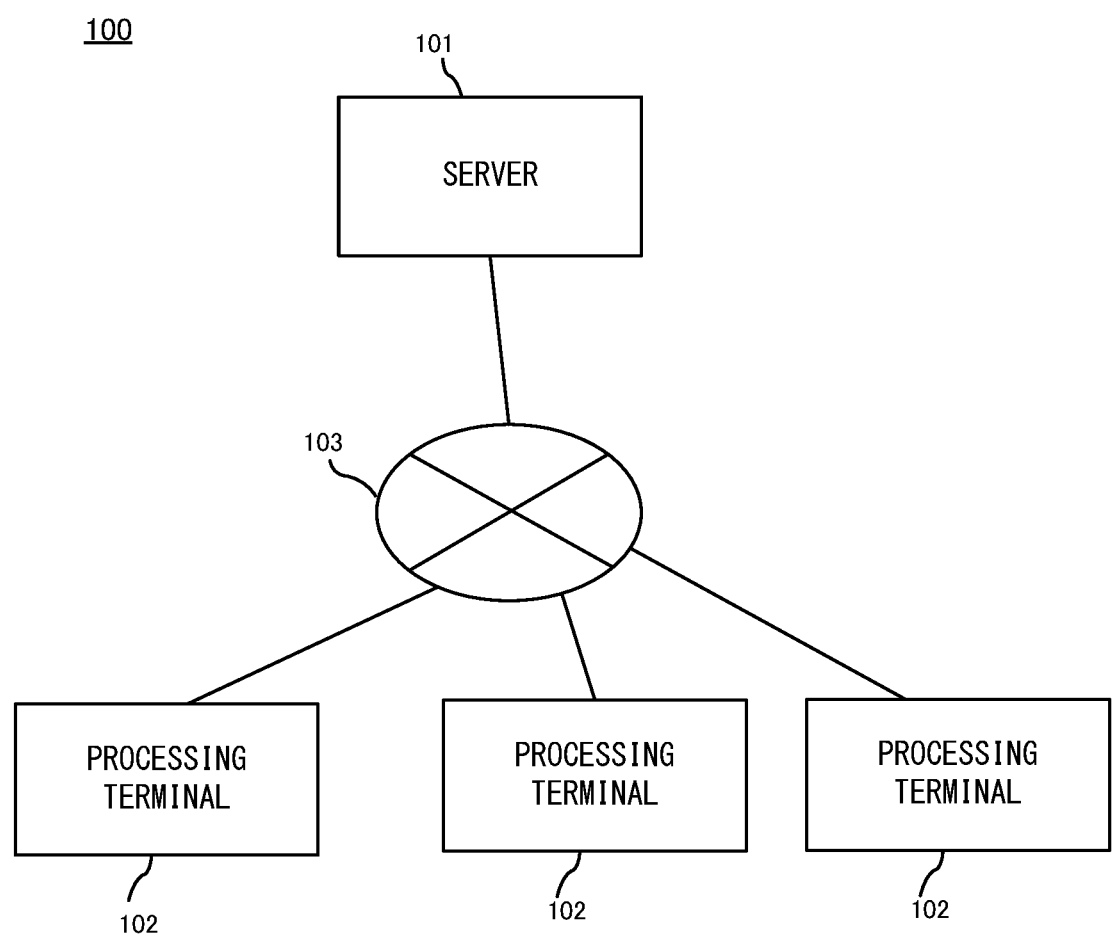
FIG. 1 is a schematic diagram showing a non-limiting example of the overall configuration of a processing system according to an exemplary embodiment.

Hereinafter, one exemplary embodiment will be described. It is to be understood that, as used herein, elements and the like written in a singular form with a word "a" or "an" attached before them do not exclude those in the plural form. FIG. 1 is a schematic diagram illustrating a non-limiting example of the entire configuration of a processing system according to the exemplary embodiment. A processing system 100 of the exemplary embodiment includes a server 101 and a plurality of processing terminals 102. The server 101 and each processing terminal 102 are configured to be able to communicate with each other via the Internet 103. In the exemplary embodiment, with such a configuration, processing is executed. Hereinafter, a description will be given with game processing as an example of the processing. Specifically, game processing for which a game program is installed on the processing terminal 102 and which is executed while communication with the server 101 is being performed as necessary, will be described as an example.

[Hardware Configuration of Server]

Figure 2:
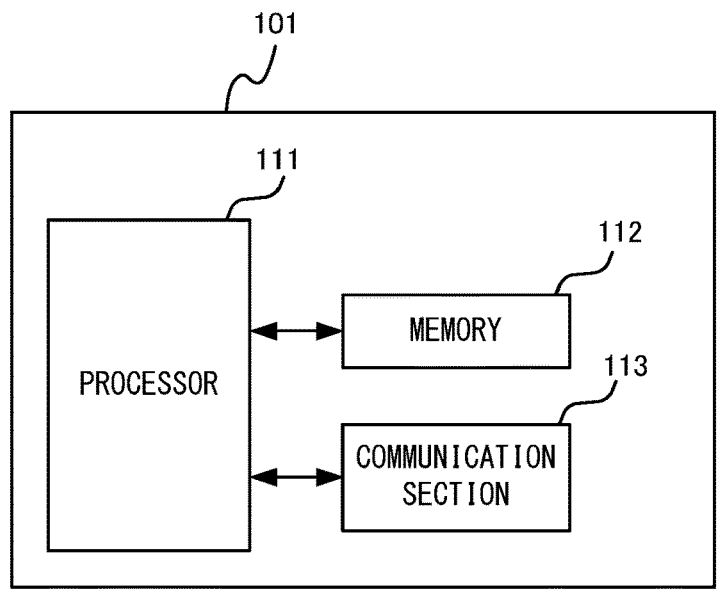
FIG. 2 is a block diagram showing a non-limiting example of the hardware configuration of a server 101.

Next, the hardware configuration of the server 101 will be described. FIG. 2 is a block diagram illustrating a non-limiting example of a hardware configuration of the server 101. The server 101 includes at least a processor 111, a memory 112, and a communication section 113. The processor 111 executes various programs for controlling the server 101. In the memory 112, various programs to be executed by the processor 111 and various kinds of data to be used by the processor 111 are stored. The communication section 113 connects to a network by means of wired or wireless communication and transmits/receives predetermined data to/from each processing terminal 102 or another server (not shown).

[Hardware Configuration of Processing Terminal]

Figure 3:
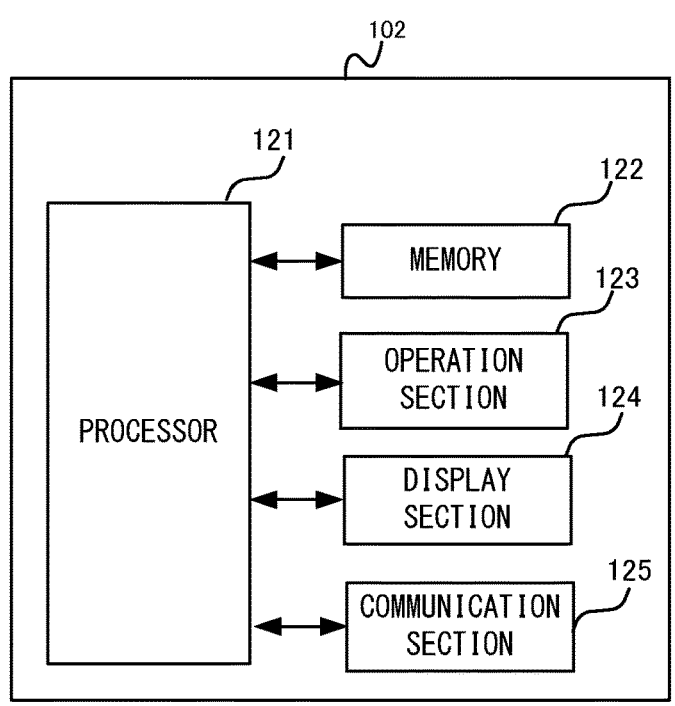
FIG. 3 is a block diagram showing a non-limiting example of the hardware configuration of a processing terminal 102.

FIG. 3 is a block diagram illustrating a non-limiting example of a hardware configuration of the processing terminal 102 in which game processing according to the exemplary embodiment is executed. Here, in the exemplary embodiment, for example, a smart device such as a smartphone and a tablet-type processing apparatus, a game apparatus such as a stationary game apparatus and a hand-held game apparatus, a personal computer, or the like is assumed as the processing terminal 102. In the exemplary embodiment, the case of using a processing terminal (e.g., smartphone) having a display screen and a touch panel in an integrated form will be described as an example. Therefore, an input operation is mainly an input to the touch panel. In another exemplary embodiment, an input operation may be performed using a physical controller connected to the processing terminal wirelessly or by wire, or an input device formed integrally with the processing terminal, for example.

In FIG. 3, the processing terminal 102 includes a processor 121, a memory 122, an operation section 123, and a display section 124. The processor 121 executes later-described game processing or executes a system program (not shown) for controlling overall operation of the processing terminal 102, thereby controlling operation of the processing terminal 102. The processor 121 may include a single processor or a plurality of processors. In the memory 122, various programs to be executed by the processor 121 and various kinds of data to be used in the programs are stored. The memory 122 is, for example, a flash EEPROM or a hard disk device. The operation section 123 is an input device for receiving an operation from a user, and in the exemplary embodiment, the operation section 123 is mainly assumed to be a touch panel. In another exemplary embodiment, various pointing devices, various press-type buttons, an analog stick, and the like may be employed. The display section 124 is typically a liquid crystal display device. The communication section 125 is connected to a network via wired or wireless communication, and transmits/receives predetermined data to/from the server 101.

[Outline of Game Process in the Exemplary Embodiment]

The exemplary embodiment relates to a process for changing the outer appearance of a character appearing in a game. In the exemplary embodiment, a "skin" that allows the outer appearance of a character to be changed is given when a predetermined condition is satisfied. Further, at the same time, the status of the corresponding character is changed so as to make it possible to advantageously progress the game (e.g., increase attack power).

Hereinafter, the outline of the game process executed in the exemplary embodiment will be described. In the exemplary embodiment, as the game in which characters appear as described above, a simulation role playing game (hereinafter, SRPG) is assumed. In this game, a battle is conducted in a turn-based simulation game system between an "own force" controlled by a player and an "enemy force" controlled by a computer (hereinafter, in the game, a scene in which the game is progressed in this system is called an SLG part). In this game, a "character" possessed by the user is used as a "piece" in the SLG part. The user moves each character on a map formed of a predetermined number of squares, and causes the character to fight against a character of the enemy force. When characters fight one on one, a battle animation can be displayed as a battle scene representation. It is noted that such a character can be acquired when a predetermined condition is satisfied, e.g., when the game scenario progress level reaches a predetermined value. In addition, a character can also be acquired through execution of predetermined lottery processing. Further, it is also possible to acquire a character by purchasing a "costume" as described later.

In this game, it is possible to organize "same" characters as the above characters that can organize the "own force" in the SLG part. As an example, it is assumed that there are characters named "Tanaka", "Suzuki", and "Sato" as characters appearing in the game. The user can acquire a plurality of each of these characters, and for example, it is possible to possess three units of "Tanaka", five units of "Suzuki", and eight units of "Sato". Then, it is possible to include, for example, two units of "Tanaka", two units of "Suzuki", and three units of "Sato" in an organization as a troop of the "own force" to set out in the SLG part. It is noted that such characters possessed by the user are the same character in terms of name, but in the internal processing, they are assigned with individual IDs for identifying them and are managed on a "piece" basis. In the following description, characters having the same name such as "Tanaka" or "Suzuki" are referred to as "same-name characters". In addition, when a character is mentioned as each individual piece in the SLG part, the character is referred to as "individual character".

In addition, there is a feature of growing individual characters, and they can earn experience points by repeating battles and thus can "level up". By leveling up, parameters (mainly relevant to the SLG part) set for each individual character also increase. For the parameters, at least as initial values, common values are set on a same-name character basis. For example, the parameter values are different between "Tanaka" and "Suzuki" at level 1, and meanwhile, in the case where there are three units of "Tanaka" at level 1, these three units have the same parameters.

Here, for the characters, outer appearance images are set in advance on the same-name character basis (example of "first image"). In this example, the outer appearance images include a "whole body image", a "list image", a "piece image", and a "battle animation image" (that is, these are collectively referred to as outer appearance images). The "whole body image" is an image displayed on a screen for confirming the details of the character, for example, and is an image representing the whole body of the character (in another game, may be called a "standing pose drawing", etc.). The "list image" is an image used when characters are displayed as a list (e.g., FIG. 5 described later), and is an image of only a face part of the character, for example. The "piece image" is an image displayed as a piece in the SLG part, and is an image deformed into a two-heads-high character, for example. The "battle animation" image is an image used for displaying the battle animation. As described above, various types of images for representing the outer appearance of each character are set, and basically, the same image is set among the same-name characters.

In the exemplary embodiment, the characters are assumed to be human characters. In another exemplary embodiment, a motif other than a human may be used as the character. For example, an animal, a robot, a monster, or the like may be used as the character. Further, an anthropomorphized inanimate object (e.g., a weapon, a vehicle, a tool, etc.) may be used as the character defined here. That is, any content that can be used by the user in the game may be employed.

In the exemplary embodiment, the user can acquire data called a "costume skin" that allows the outer appearance of the character to be changed, by satisfying a predetermined condition. Specifically, in this game, in a state in which the user has signed up for a predetermined subscription service (e.g., a service based on monthly charge), the user can purchase the "costume skin". That is, the user can gain a right to purchase the costume skin by signing up for the subscription service (if the user withdraws from the service, the user loses the purchase right until signing up again). Each kind of costume skin can be purchased only once, that is, it is impossible to repeatedly purchase the same costume skin a plurality of times, for example. The costume skin is an image representing the character that has changed to another costume (from the default costume), for example, and thus is an image (example of "second image") of an outer appearance different from the outer appearance image set in advance. Then, when the user has purchased the costume skin, the outer appearance images of all the same-name characters (hereinafter, referred to as skin corresponding characters) that are possessed by the user at this time and correspond to the costume skin, are uniformly changed. That is, change of the outer appearance image (and increase of a parameter described later) is executed on all the skin corresponding characters that have been possessed since before the purchase of the costume skin. In the case where a sound is set for the characters, e.g., in the case where a sound emitted in the battle animation is set, not only the image but also such a sound may be changed.

Figure 4:
FIG. 4 shows a non-limiting example of a game screen.

FIG. 4 shows a non-limiting example of a screen for purchasing the costume skin. When the user signs up for a predetermined subscription service, it becomes possible to display such a purchase screen for "costume skins". On this screen, "costume skins" that can be purchased are displayed in a manner that allows the skin corresponding characters to be identified. In the example in FIG. 4, three icon images including face images of the skin corresponding characters, character names thereof, the names of the costume skins, and purchase prices, are displayed. By the user selecting a desired costume skin from these, a predetermined purchase confirmation screen (not shown) is displayed. Then, by the user performing a purchase operation, the costume skin is given to the user. In addition, along with the timing of the purchase, processing of changing the outer appearance image of the skin corresponding character is performed.

At the time of the purchase, processing of giving the user one unit of the skin corresponding character corresponding to the purchased costume skin is also performed. That is, by purchasing the "costume skin" of a character that has not been possessed by the user, the user can also acquire the corresponding character itself. In another exemplary embodiment, a plurality of units of the skin corresponding character may be given.

In the exemplary embodiment, at the same time as the purchase of the costume skin, the parameters of the skin corresponding character can be increased. Specifically, the parameters at present are incremented by predetermined values. In the exemplary embodiment, all the parameters are incremented by +1, as an example. Here, targets of the parameter change are all the "same-name characters". For example, it is assumed that the skin corresponding character is "Tanaka" and the user possesses three units of Tanaka. The three units of "Tanaka" are denoted by "Tanaka A", "Tanaka B", and "Tanaka C". For all these three units, the outer appearance images are changed and the parameters at present are incremented by the predetermined value, i.e., +1. For example, it is assumed that Tanaka A is level 5, Tanaka B is level 3, and Tanaka C is level 1. Since there is a feature of growing the characters as described above, the three units of "Tanaka" have differences in HP, attack power, and the like. For example, it is assumed that the attack power of Tanaka A is 10, the attack power of Tanaka B is 8, and the attack power of Tanaka C is 5. In this state, when the user has purchased the costume skin, all the same-name characters are subjected to the parameter change (attack power +1), and as a result, the attack power of Tanaka A becomes 11, the attack power of Tanaka B becomes 9, and the attack power of Tanaka C becomes 6.

In the exemplary embodiment, the parameter is increased in such a manner as to "add" a value defined for each costume skin to the present parameter of the individual character ("increment/raise the present parameter by the value"). However, the method for increasing the parameter is not limited thereto. In another exemplary embodiment, for example, the increase rate or the increase multiplication factor of the parameter may be defined for the costume skin. Then, the parameter increase may be performed by increasing the present parameter of the individual character on the basis of the increase rate or the multiplication factor. Examples include increasing the present parameter by 10%, increasing the present parameter to be 1.5 times greater, and the like.

In the exemplary embodiment, the outer appearance image of the skin corresponding character is changed at the same time as the purchase of the costume skin, and thereafter, in accordance with the user's operation, it is possible to return the outer appearance image to the original one on an individual character basis. That is, it is also possible to "remove" the costume skin. In the exemplary embodiment, even when the costume skin is removed and the outer appearance image is returned to the original one, the effect of the parameter increase described above is not lost. For example, even when the outer appearance image of Tanaka A is returned to the original one, the effect of attack power +1 is maintained without being lost.

Figure 5:
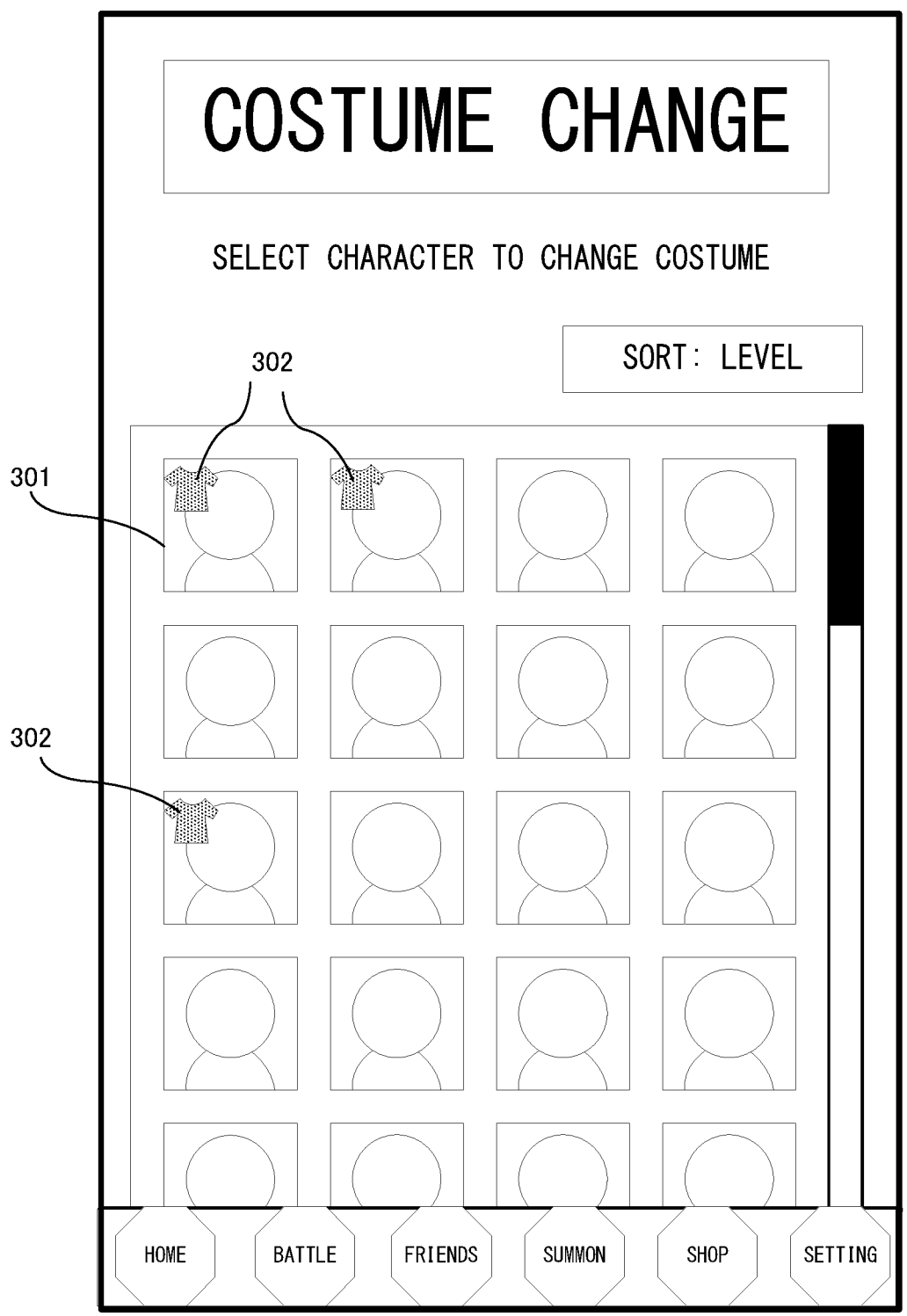
FIG. 5 shows a non-limiting example of a game screen.

FIG. 5 shows a non-limiting example of an outer appearance selection screen which is a screen for changing the costume skin. For example, when the user presses a "costume change" button (not shown) on a predetermined game menu, a screen as shown in FIG. 5 is displayed. On this screen, face images (hereinafter, icon images) 301 of the individual characters possessed by the user are displayed as a list. Here, each icon image includes an indication for indicating whether or not a costume skin is set (put on). Specifically, in a state in which a costume skin is set (state in which the outer appearance is changed), a put-on mark 302 is displayed at the upper left of the icon (as a matter of course, the icon image itself has also been changed from the default image). In a state in which a costume skin is not set (state in which the outer appearance is not changed), the put-on mark 302 is not displayed. In this way, it becomes easy to grasp whether a costume skin is put on, in the list image.

Figure 6:
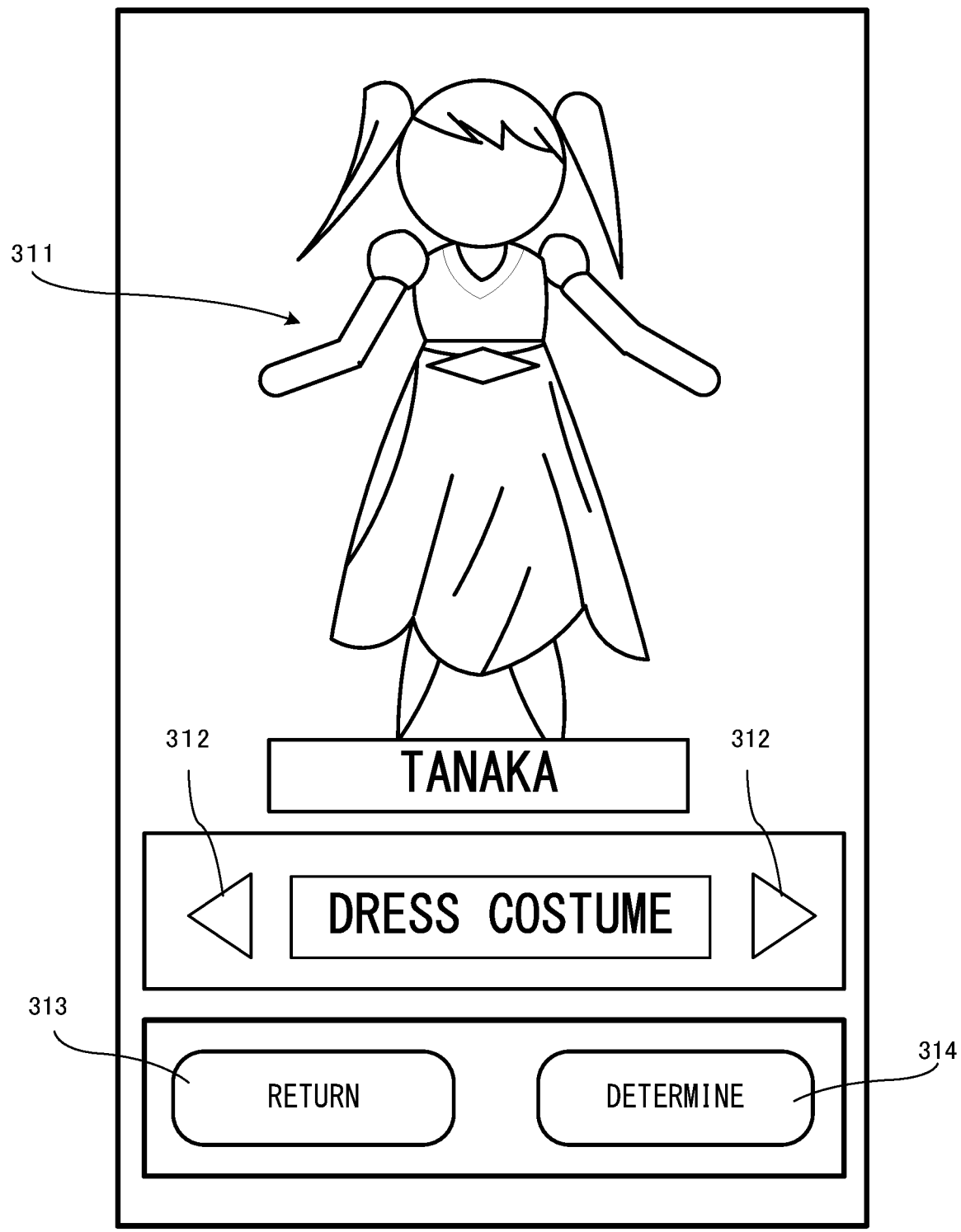
FIG. 6 shows a non-limiting example of a game screen.
Figure 7:
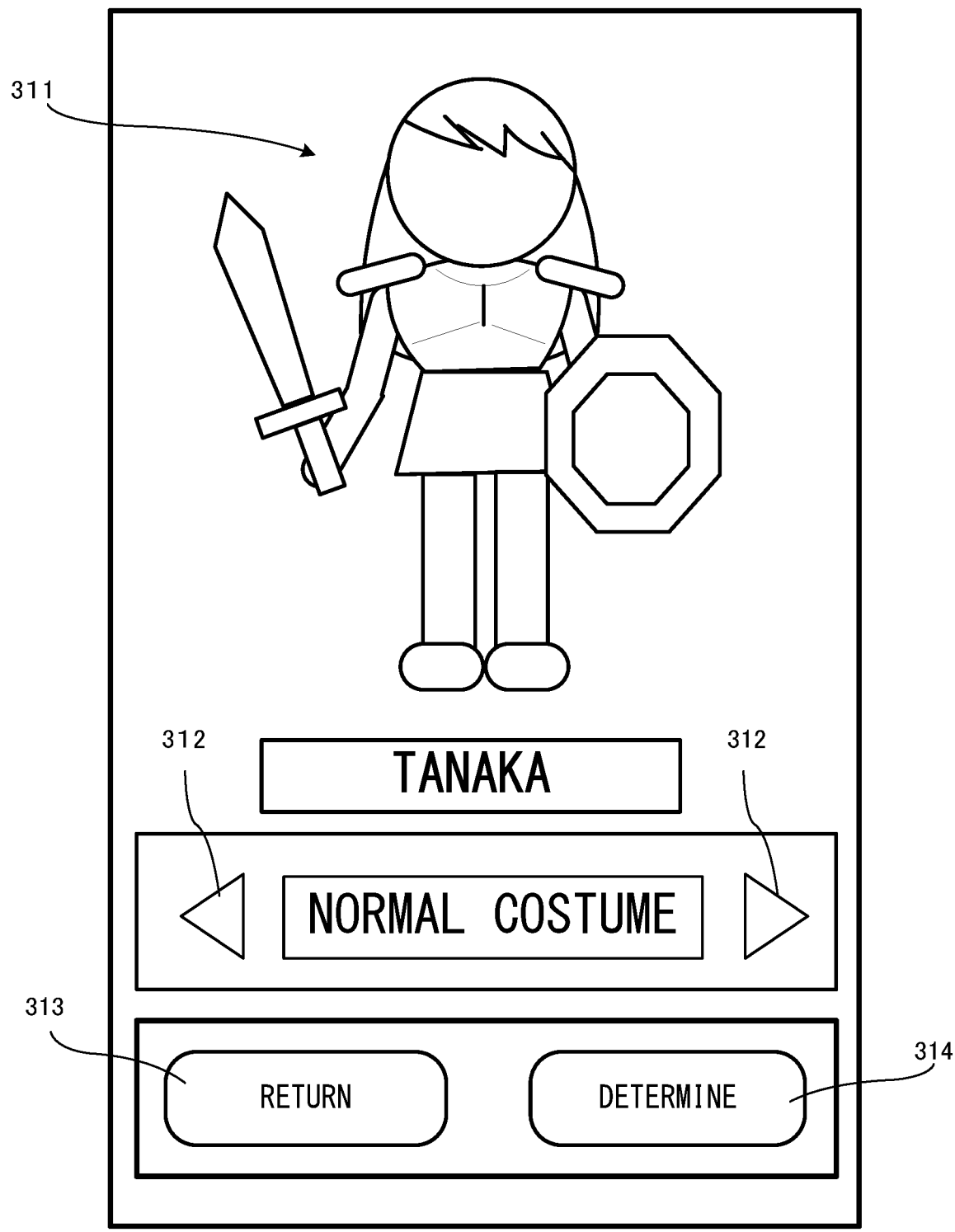
FIG. 7 shows a non-limiting example of a game screen.

On the above screen, when the user selects the icon image of the individual character for which the user desires to change the costume skin, a screen as shown in FIG. 6 is displayed. On this screen, a whole body image 311 (in a state in which a costume skin is set in FIG. 6) of the individual character, an outer appearance switch button 312, a return button 313, and a determination button 314 are displayed. Besides, the character name and the costume skin name are also displayed. By operating the outer appearance switch button 312, it is possible to switch the outer appearance image to be set. When the switch operation is performed, a whole body image in a state in which the purchased costume skin is not set (i.e., the default image) is displayed as shown in FIG. 7, for example. While confirming the outer appearance by the whole body image 311, the user selects an outer appearance image to which the user desires to change the character, and operates the determination button 314, whereby the user can determine change of the outer appearance image. As described above, even when the outer appearance image is changed through such an operation, the parameter increase effect due to the purchase of the costume skin remains maintained.

In the case where a same-name character is further acquired after the purchase of the costume skin as described above, in the exemplary embodiment, the same-name character is acquired in a state in which the outer appearance change and the parameter increase effect are applied. For example, in the case where a costume skin is purchased for "Tanaka" and then another unit of "Tanaka" is further acquired through predetermined lottery processing, an image in which the outer appearance has been changed is used in a representation at the time of the acquisition and the like. In addition, said another unit of "Tanaka" is acquired in a state in which the parameter increase effect is also applied.

Even if the user withdraws from the subscription service after purchasing the costume skin, the purchased costume skin is maintained to be effective, without deletion thereof or the like.

[Details of Game Process in the Exemplary Embodiment]

Next, with reference to FIG. 8 to FIG. 17, the game process in the exemplary embodiment will be described in more detail. In the following description, processes relevant to purchase and change of the costume skin will be mainly described, and description of the other game processes is omitted.

[Used Data]

Figures 8, 9, 10:
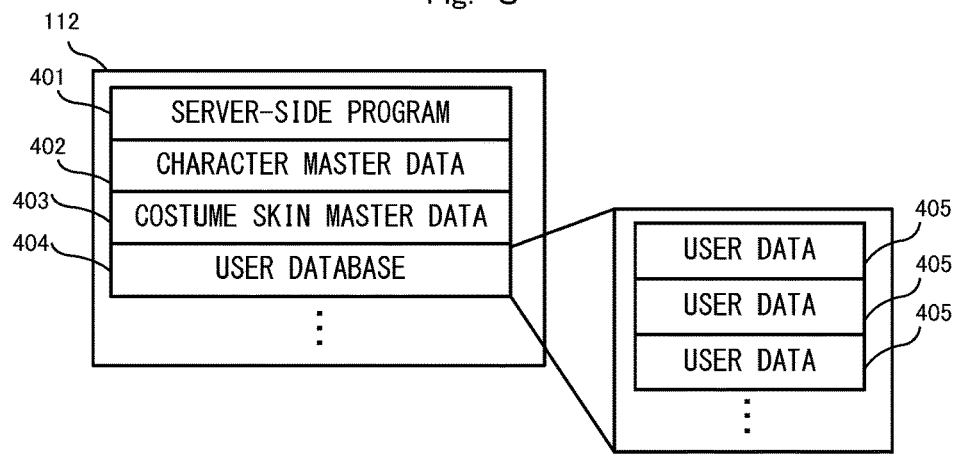
FIG. 8 shows a non-limiting example of data stored in a memory 112 of a server 101.
FIG. 9 shows a non-limiting example of the data configuration of character master data 402.
FIG. 10 shows a non-limiting example of the data configuration of costume skin master data 403.

First, various types of data used in this game process will be described. First, data used in the server 101 will be described. FIG. 8 is a memory map showing a non-limiting example of various data stored in the memory 112 of the server 101. The memory 112 of the server 101 stores a server-side program 401, character master data 402, costume skin master data 403, a user database 404, and the like.

The server-side program 401 is a program for executing the game process in the exemplary embodiment. For example, the server-side program 401 is a program for performing log-in processing for a user and processing for transmitting various data needed for the game process to the processing terminal 102 as appropriate.

The character master data 402 is data for defining basic information about all the characters appearing in this game. FIG. 9 shows a non-limiting example of the data configuration of the character master data 402. The character master data 402 shown in FIG. 9 is table-format data including items such as a character ID 511, basic parameter information 512, and basic image data 513. The character ID 511 is an ID for uniquely identifying a character on the same-name character basis. The basic parameter information 512 is information indicating initial values (e.g., values at level 1) of parameters (hit points, attack power, etc.) of same-name characters. In addition, the basic parameter information 512 also includes information defining the details (increase width, growth table, etc.) of increase of the parameters at the time of leveling up. In other words, this information indicates the parameters of same-name characters when parameter change due to a costume skin described above has not been applied. The basic image data 513 is data indicating a basic (initial value) outer appearance image of the same-name characters.

Returning to FIG. 8, the costume skin master data 403 is data defining the details of the costume skins used in this game. FIG. 10 shows a non-limiting example of the data configuration of the costume skin master data 403. The costume skin master data 403 is table format data including at least a costume ID 521, a corresponding character ID 522, change value information 523, and costume image data 524. The costume ID 521 is an ID for uniquely identifying each costume skin. The corresponding character ID 522 is information for specifying same-name characters whose outer appearance images can be changed by the costume skin. Any of the characters IDs 511 in the character master data 402 can be designated here. The change value information 523 is information defining the details of change of a parameter to be changed by the costume skin. In the exemplary embodiment, the parameter change is performed by adding a value indicated by the change value information 523 to the parameter value in the basic parameter information 512. Therefore, in the change value information 523, for example, information indicating "all parameters +1" or the like is defined. The costume image data 524 is image data of an outer appearance image for the costume skin.

For the character master data 402 and the costume skin master data 403, the data contents (such as new character and new costume) can be added as appropriate by a game administrator, for example. For example, only a costume skin for "Tanaka" may be provided at the beginning of the game, and then a costume skin for "Suzuki" can be newly provided afterward. In other words, it can be said that a condition for acquiring a costume skin can be added (in this example, the condition is that a costume skin is purchased in a state in which the user signs up for the subscription service).

In the exemplary embodiment, it is assumed that only one costume skin at maximum is provided for one kind of same-name characters. However, in another exemplary embodiment, plural kinds of costume skins may be provided for one kind of same-name characters. In this case, the details of parameter change may be made different among these plural kinds of costume skins, or may be common among them.

Returning to FIG. 8, the user database 404 is a database of collection of data regarding users who play the game of the exemplary embodiment. In the exemplary embodiment, the user database 404 is a database in which each user data 405 described later is configured as one record. In the processing terminal 102, after log-in processing is performed, processing of acquiring the user data 405 corresponding to the user from the server 101, and the like are performed.

Figures 11, 12:
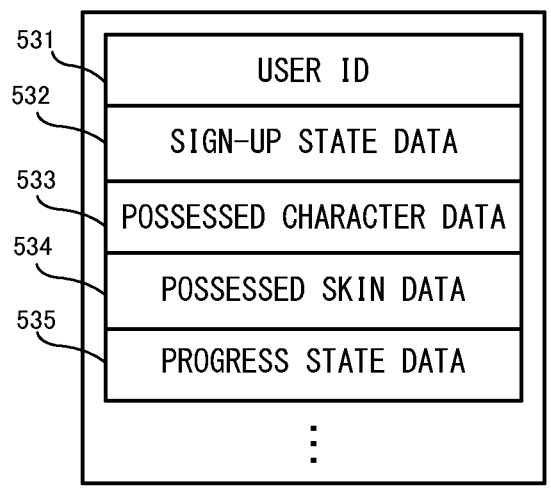
FIG. 11 shows a non-limiting example of the data configuration of user data 405.
FIG. 12 shows a non-limiting example of the data configuration of possessed character data 533.

With reference to FIG. 11, the data configuration of the user data 405 will be described. The user data 405 shown in FIG. 11 includes a user ID 531, sign-up state data 532, possessed character data 533, possessed skin data 534, progress state data 535, and the like. The user ID 531 is an ID for uniquely identifying each user. The sign-up state data 532 is information indicating whether or not the user has signed up for the subscription service described above. In the exemplary embodiment, the subscription service is assumed to be a subscription service based on monthly charge.

The possessed character data 533 is data indicating the individual characters possessed by the user. FIG. 12 shows a non-limiting example of the data configuration of the possessed character data 533. The possessed character data 533 is table format data including items such as a possession number 551, a character ID 552, level information 553, present outer appearance information 554, and a parameter change flag 555. The possession number 551 is a number for uniquely identifying each individual character possessed by the user. For example, the possession number 551 is a number assigned in the order of acquisition of the individual character. The character ID 552 is information indicating which same-name character each possessed character is, and the character ID 552 corresponds to the character ID 511 in the character master data 402. The level information 553 is data indicating the level of the individual character at present. The present outer appearance information 554 is information indicating which image the outer appearance image of the individual character is at present. In other words, regarding each same-name character for which a costume skin has been purchased, the present outer appearance information 554 indicates whether the image of the purchased costume skin is applied or the outer appearance image as the initial value is applied. The parameter change flag 555 is information indicating whether or not parameter change based on the purchase of the costume skin is applied. The initial value thereof is set at "OFF", and when a costume skin is purchased, the parameter change flag 555 is set to "ON". The individual character for which this flag is "ON" is to be treated in a state in which the parameter increase due to the costume skin is applied in the SLG part or the like, for example.

Returning to FIG. 11, the possessed skin data 534 is information for specifying costume skins already purchased by the user. For example, the costume ID 521 corresponding to each purchased costume skin can be stored.

The progress state data 535 is data indicating the progress state of the game for the user. For example, the progress state data 535 is data indicating a part to which the game has progressed in a story mode, and the like. On the basis of this data, the user can restart the game interrupted the last time, from the subsequent part.

Besides, although not shown, the user data 405 includes information about individual users, such as user profile information to be used for log-in processing.

Figure 13:
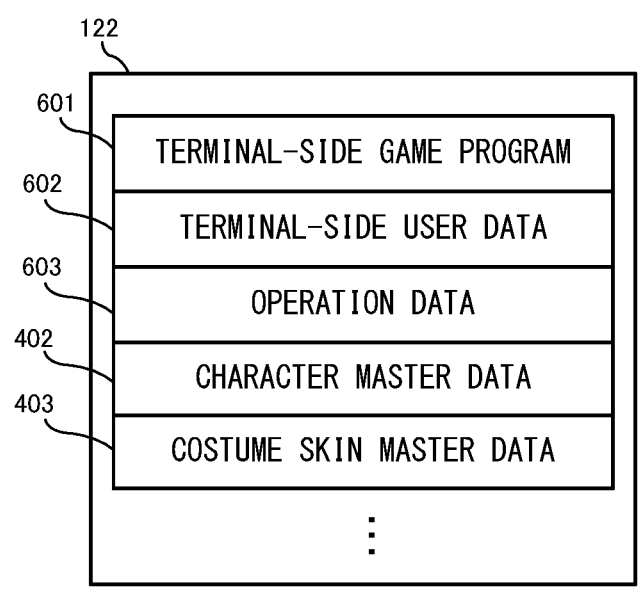
FIG. 13 shows a non-limiting example of data stored in a memory 122 of a processing terminal 102.

Next, various types of data stored in the memory of the processing terminal 102 will be described. FIG. 13 is a memory map showing a non-limiting example of various data stored in the memory 122 of the processing terminal 102. The memory 122 of the processing terminal 102 stores a terminal-side game program 601, terminal-side user data 602, operation data 603, the above-described character master data 402, the above-described costume skin master data 403, and the like.

The terminal-side game program 601 is a program for executing the game process in the exemplary embodiment.

The terminal-side user data 602 is data obtained by copying, onto the memory 122, the user data 405 corresponding to the user who plays in this game process using the processing terminal 102. The data configuration thereof is the same as the data configuration shown in FIG. 11, and therefore the description thereof is omitted. During the game play, this data is updated at a predetermined timing, and is transmitted to the server 101 at a predetermined timing. The server 101 performs processing of updating the user data 405 as appropriate on the basis of the transmitted terminal-side user data 602.

The operation data 603 is data indicating an operation performed on the operation section 123 by the user, and is generated in a predetermined cycle.

The character master data 402 and the costume skin master data 403 are data copied from the server 101 onto the memory 122 at the start of this game.

Besides, the memory 122 stores various working data and the like used in this process, as appropriate.

[Details of Process Executed by Processor 121]

Next, the details of the game process in the exemplary embodiment will be described. Here, processes in the processing terminal 102 will be mainly described. Specifically, a "costume purchase process" for purchasing the costume skin and an "outer appearance change process" for changing the outer appearance image of each individual character after the purchase, will be described, and the details of the other game processes will not be described. Regarding processing in the server 101, explanation will be given as necessary. Prior to these processes, the user data 405 is acquired from the server 101, and then stored as the terminal-side user data 602 in the memory 122.

[Costume Purchase Process]

Figure 14:
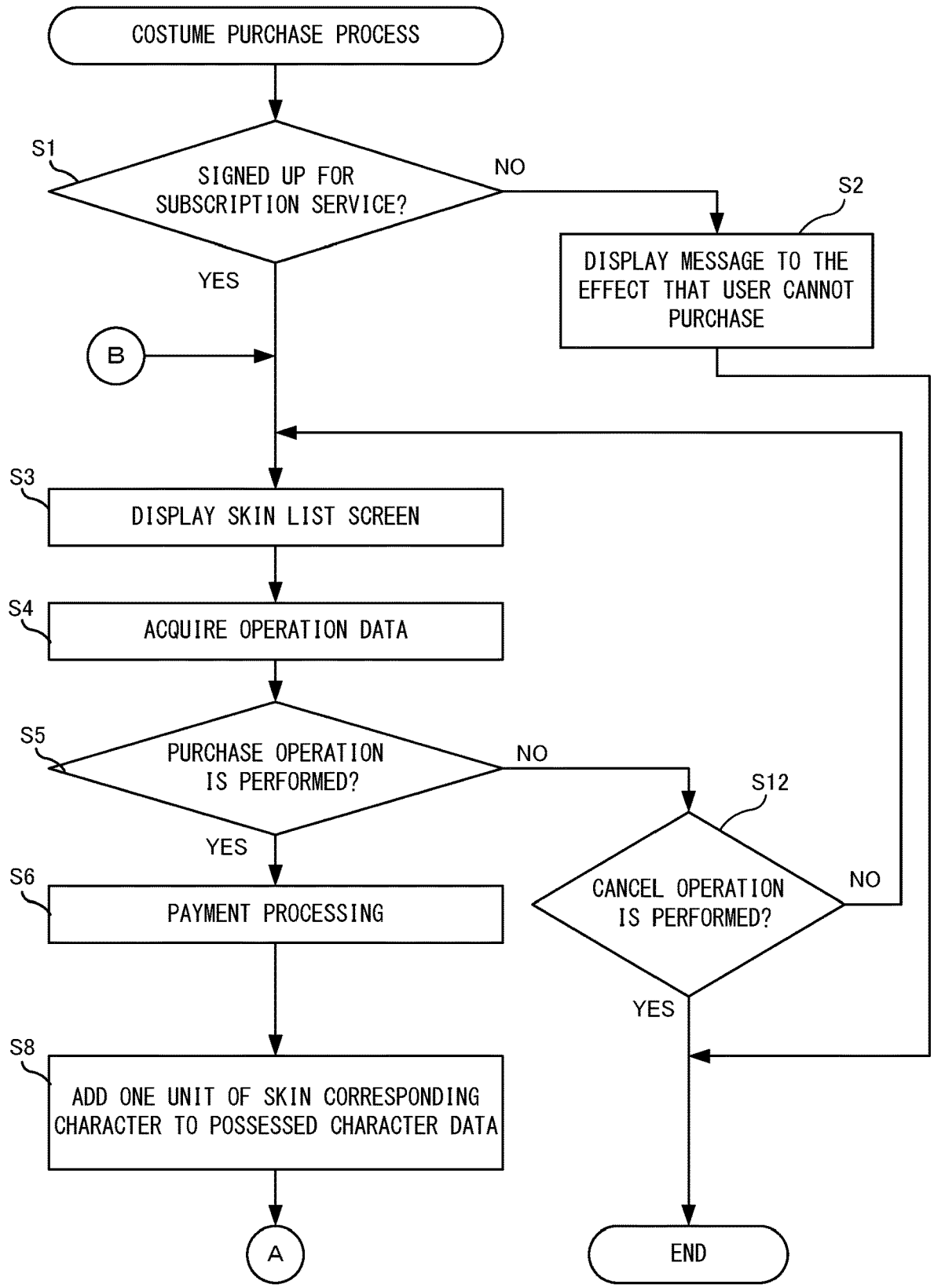
FIG. 14 is a non-limiting example flowchart showing the details of a costume purchase process.

First, the costume purchase process will be described. FIG. 14 is a flowchart showing the details of the costume purchase process. This process is started when the user performs a selecting operation on a "costume purchase" button (not shown) displayed on a predetermined game menu, for example.

First, in step S1, the processor 121 refers to the sign-up state data 532 and determines whether or not the user has signed up for the subscription service. As a result of the determination, if the user has not signed up (NO in step S1), in step S2, the processor 121 displays a message to the effect that the user cannot purchase costumes because the user has not signed up for the subscription service, and finishes the costume purchase process. At this time, a button for moving to a screen for signing up for the subscription service, or the like may be displayed together.

On the other hand, if the user has signed up for the subscription service (YES in step S1), next, in step S3, the processor 121 generates and displays a list screen of costume skins (that can be purchased) as shown in FIG. 4, on the basis of the costume skin master data 403. Then, the processor 121 waits for a user's operation.

Next, in step S4, the processor 121 acquires the operation data 603, and in the subsequent step S5, the processor 121 determines whether or not an operation of purchasing any of the skins has been performed, on the basis of the operation data 603. If a purchase operation has been performed (YES in step S5), in step S6, the processor 121 executes predetermined payment processing. Next, in step S8, the processor 121 executes processing of giving one unit of the skin corresponding character to the user. That is, the processor 121 performs processing of adding data of the skin corresponding character for one unit to the possessed character data 533.

Figure 15:
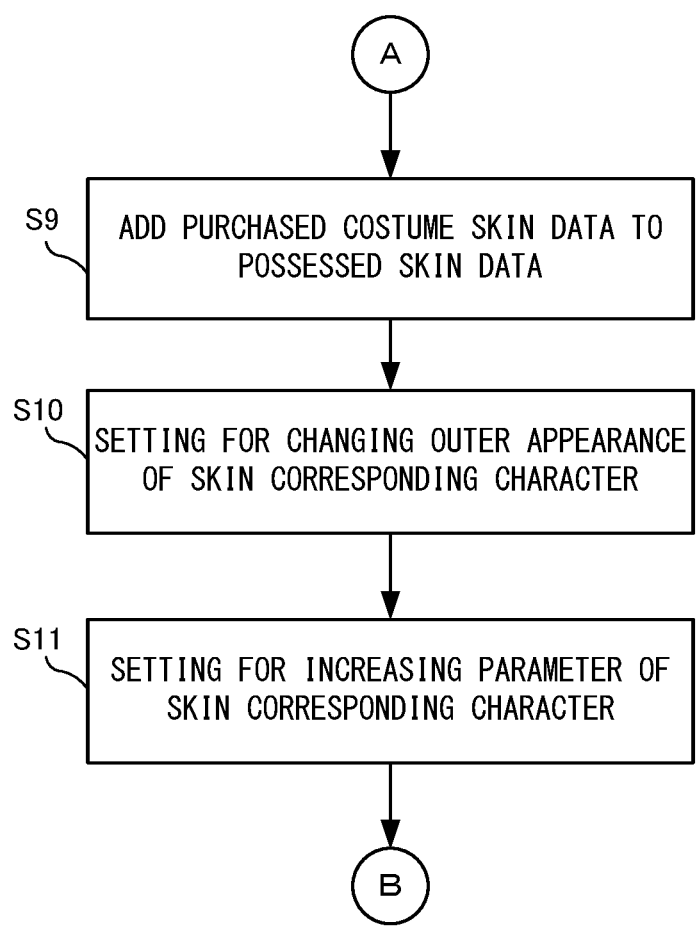
FIG. 15 is a non-limiting example flowchart showing the details of the costume purchase process.

Next, in step S9 in FIG. 15, the processor 121 adds data of the costume skin purchased at this time to the possessed skin data 534. Next, in step S10, the processor 121 performs setting for changing the outer appearance images of all the skin corresponding characters possessed by the user to those for the costume skin. Specifically, the processor 121 specifies the (same-name) character ID of the skin corresponding character for the costume skin purchased at this time. Then, the processor 121 specifies data corresponding to the specified character ID, among the possessed character data 533, and designates the costume skin purchased at this time, to the corresponding present outer appearance information 554.

Next, in step S11, the processor 121 executes processing of increasing a parameter of each individual character corresponding to the costume skin purchased at this time. Specifically, the processor 121 sets "ON" to the parameter change flag 555 for the data corresponding to the specified character ID. Thus, in the SLG part, the parameter of the individual character is treated in a state in which the parameter change value set for the costume skin is reflected therein. Thereafter, the processor 121 returns to step S3 to repeat the process.

Returning to FIG. 14, on the other hand, as a result of the determined in step S5, if a purchase operation has not been performed (NO in step S5), in step S12, the processor 121 determines whether or not a purchase canceling operation, i.e., an operation of finishing the costume purchase process has been performed. As a result of the determination, if a purchase canceling operation has not been performed (NO in step S12), the processor 121 returns to step S3 to repeat the process. If a purchase canceling operation has been performed, the processor 121 finishes the costume purchase process.

[Outer Appearance Change Process]

Figure 16:
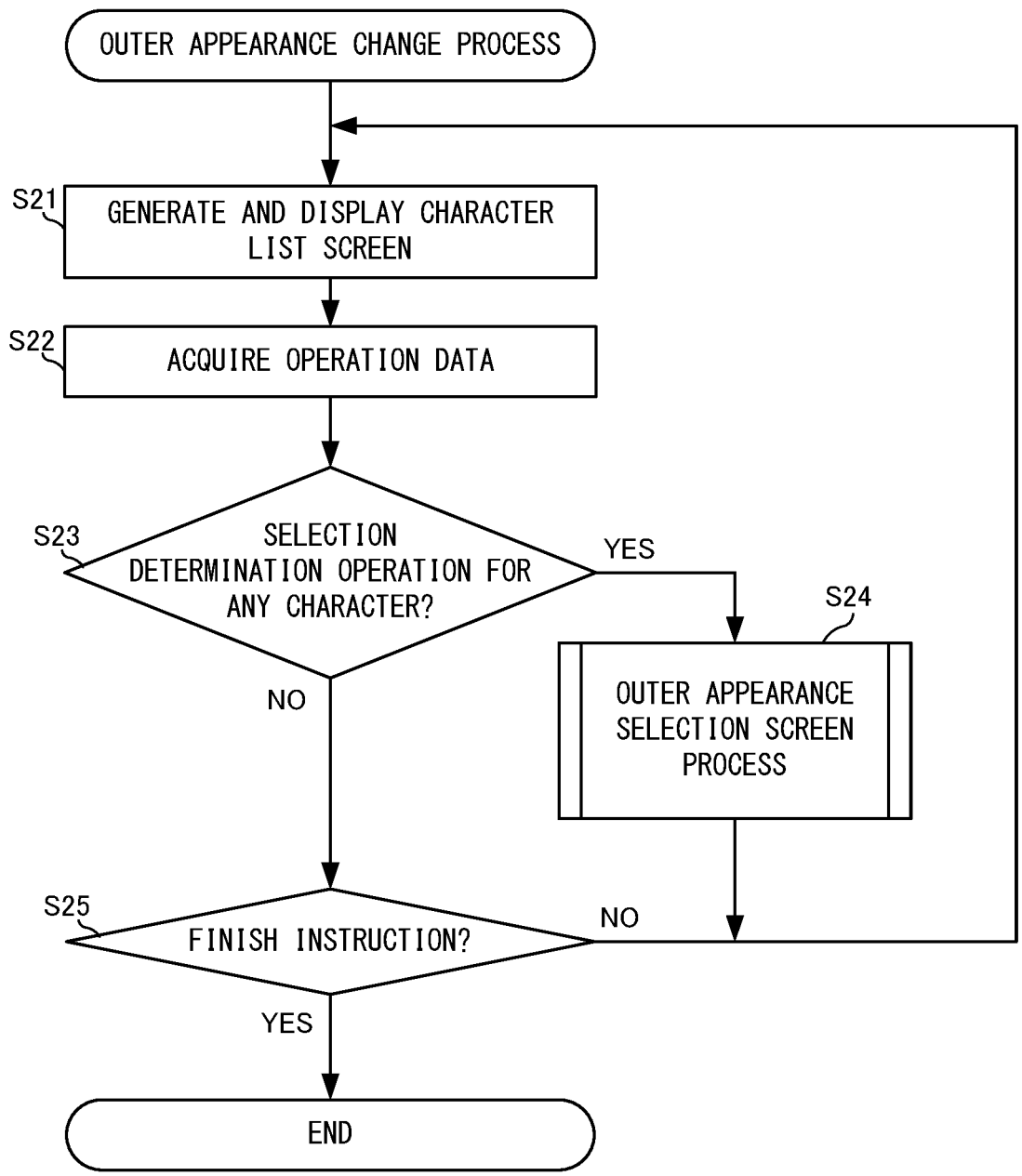
FIG. 16 is a non-limiting example flowchart showing the details of an outer appearance change process.

Next, the details of the outer appearance change process will be described. FIG. 16 is a flowchart showing the details of the outer appearance change process. This process is started when the user performs a selecting operation on a "costume change" button (not shown) displayed on a predetermined game menu, for example.

First, in step S21, the processor 121 generates a character list screen as shown in FIG. 5 on the basis of the possessed character data 533, and displays the character list screen on the display section 124.

Next, in step S22, the processor 121 acquires the operation data 603, and in the subsequent step S23, the processor 121 determines whether or not an operation of determining selection of any of the characters has been performed, on the basis of the operation data 603. As a result of the determination, if an operation of determining selection of a character has been performed (YES in step S23), in step S24, the processor 121 executes an outer appearance selection screen process, and then returns to step S21. This process is a process for selecting and determining an outer appearance image as described above with reference to FIG. 6 and FIG. 7.

Figure 17:
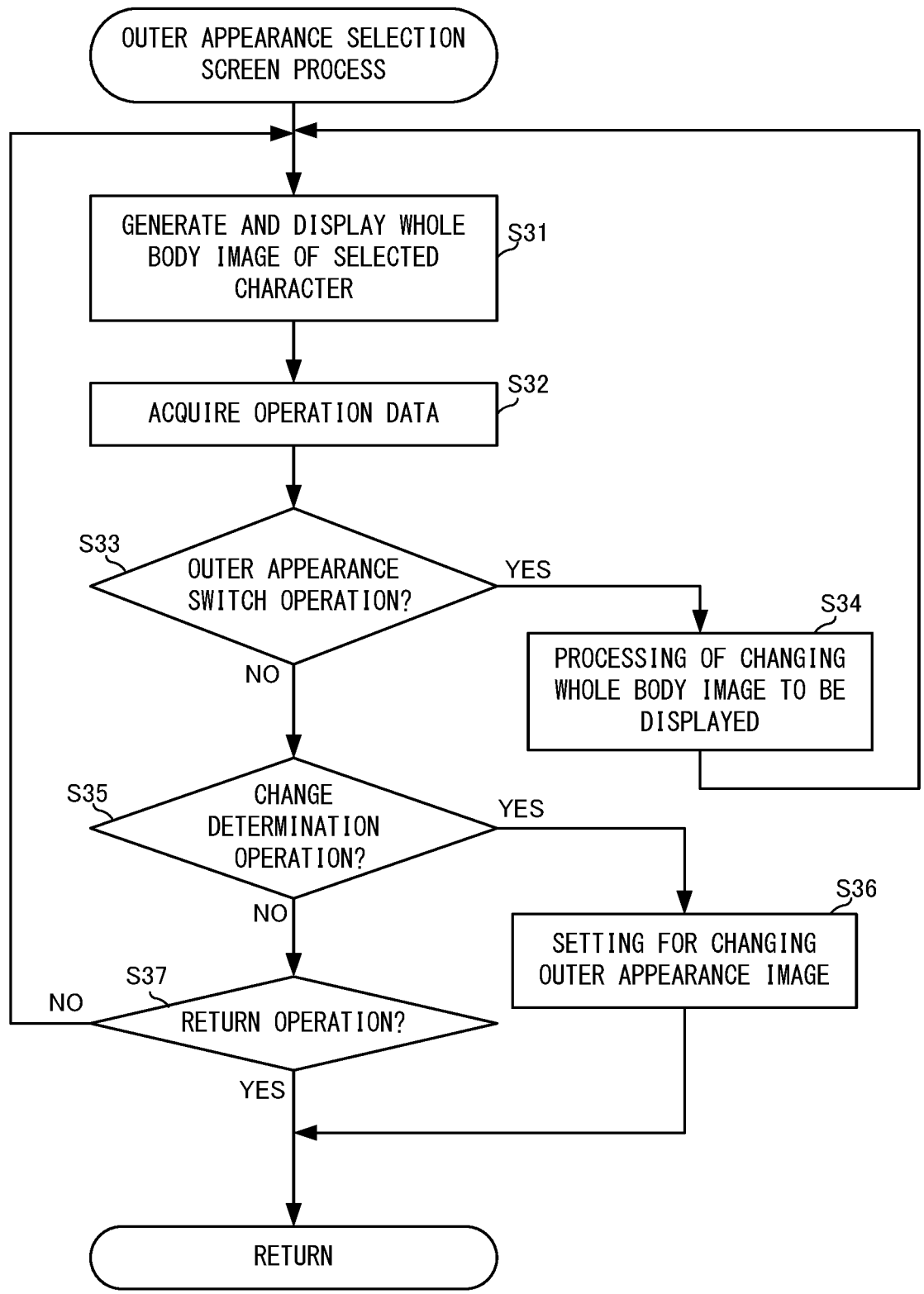
FIG. 17 is a non-limiting example flowchart showing the details of an outer appearance selection screen process.

FIG. 17 is a flowchart showing the details of the outer appearance selection screen process. First, in step S31, the processor 121 generates a screen as shown in FIG. 6 (or FIG. 7) and displays the screen on the display section 124. Specifically, first, the processor 121 specifies the present outer appearance image of the character selected in the above processing, on the basis of the present outer appearance information 554. Further, the processor 121 reads data of the whole body image of the character in accordance with the outer appearance set at present, as appropriate. Then, the processor 121 generates and displays the screen as shown in FIG. 6.

Next, in step S32, the processor 121 acquires the operation data 603, and in the subsequent step S33, the processor 121 determines whether or not an operation of switching the outer appearance has been performed, on the basis of the operation data 603. Specifically, the processor 121 determines whether or not the outer appearance switch button 312 in FIG. 6 has been operated. If the outer appearance switch button 312 has been operated (YES in step S33), in step S34, the processor 121 executes processing of changing the whole body image of the character to be displayed on the screen. For example, if the present outer appearance image is an image of the costume skin, processing of changing the present outer appearance image to the default outer appearance image (whole body image) is performed. Then, the processor 121 returns to step S31, to repeat the process (since the whole body image has been changed, the changed whole body image is displayed in the processing of step S31 after returning).

On the other hand, as a result of the determination in step S33, if the outer appearance switch button 312 has not been operated (NO in step S33), in step S35, the processor 121 determines whether or not an operation of determining change of the outer appearance has been performed, on the basis of the operation data 603. Specifically, the processor 121 determines whether or not the determination button 314 in FIG. 6 has been operated. As a result of the determination, if the determination button 314 has been operated (YES in step S35), in step S36, the processor 121 performs processing of determining change of the outer appearance image. Specifically, the processor 121 changes the content of the present outer appearance information 554 so that the outer appearance image for which the change determination instruction has been performed is designated for all the characters corresponding to the same character ID 552 as the character for which the change determination instruction has been performed. Thus, change of the outer appearance image is reflected in all the same-name characters. It is noted that only the outer appearance image is changed here and therefore increase of the parameter due to the purchase of the costume skin is maintained irrespective of the change of the outer appearance, as described above. Then, the outer appearance selection screen process is finished.

On the other hand, as a result of the determination in step S35, if a change determination operation has not been performed (NO in step S35), in step S37, the processor 121 determines whether or not an operation for finishing the outer appearance selection screen process has been performed, on the basis of the operation data 603. Specifically, the processor 121 determines whether or not the return button 313 in FIG. 6 has been operated. As a result of the determination, if the return button 313 has not been operated (NO in step S37), the processor 121 returns to step S31, to repeat the process. If the return button 313 has been operated (YES in step S37), the processor 121 finishes the outer appearance selection screen process.

Returning to FIG. 16, as a result of the determination in step S23, if an operation of determining selection of the character has not been performed (NO in step S23), in step S25, the processor 121 determines whether or not an operation for finishing the outer appearance change process (finish instruction) has been performed, on the basis of the operation data 603. As a result of the determination, if the finish instruction has not been performed (NO in step S25), the processor 121 returns to step S21, to repeat the process. On the other hand, if the finish instruction has been performed (YES in step S25), the processor 121 finishes the outer appearance change process.

Thus, the detailed description of the game process in the exemplary embodiment has been finished.

As described above, in the exemplary embodiment, when a predetermined condition is satisfied, a costume skin that allows the outer appearance of a character to be changed can be acquired, and at the same time as the acquisition, a parameter of the skin corresponding character can be increased. Further, even if the outer appearance image of the skin corresponding character is returned to its original one afterward, the effect of the parameter increase can be maintained as it is without being lost. Thus, while a degree of freedom in changing the outer appearances of a character is provided to a user, the performance of the character in the game can be improved. Therefore, for example, if a costume skin as described above is provided to a specific character to which the user has an attachment, the user can enjoy changing the appearance of the character as appropriate and also can improve performance of the character. This can give the user a motivation to continue to use such a character to which the user has an attachment in the game for a long period, thus enhancing amusement of the game.

[Modifications]

The game to which the above process is applied may be any game as long as characters as described above appear in the game, and for example, a role playing game, a simulation game, an action game, a shooting game, a puzzle game, etc. are also applicable. For example, such a game may be configured so as to allow the outer appearance of the character operated by a player to be changed and increase the performance of the character. Regarding the increase of the character performance, besides increase of a parameter as described above, the following method may be adopted. For example, a predetermined skill, magic, technique, or equipment may be added or made available, or a given time for thinking in a puzzle may be increased, whereby adjustment/change for allowing the player to play the game more advantageously may be performed on the character.

In the game, a screen (hereinafter, a status confirmation screen, which is not shown) on which specific numerical values of the parameters of each individual character may be allowed to be displayed. Then, on the status confirmation screen, a display manner may be made different so that the user can recognize whether or not each costume skin has been purchased, i.e., whether or not the parameter change based on each costume skin has been applied. For example, while "attack power 10" is indicated on the character for which a costume skin has not been purchased, "attack power 10 (+1)" may be indicated on a character for which a costume skin has been purchased, and thus a display manner may be made different. Besides, for a character for which a costume skin has been purchased, a predetermined mark (e.g., armor icon image) indicating that the costume skin has been purchased (the costume skin is possessed) may be indicated at a predetermined position on the status confirmation screen.

In the above example, the case where the outer appearance image is changed at the same time as purchase of a costume skin, has been shown. In another exemplary embodiment, the outer appearance image may not be changed at the same time as the purchase. In this case, the purchase of the costume skin corresponds to the user obtaining a right to change the outer appearance image.

In the case where the outer appearance image is not changed at the same time as purchase of a costume skin as described above, only the parameter change as described above may be applied at the same time as the purchase. Alternatively, the parameter change may be applied at a timing of changing the outer appearance to the costume skin for the first time after the purchase. In the latter case, the purchase of the costume skin corresponds to the user obtaining a right to increase the parameter.

In the above example, one unit of a skin corresponding character is given when a costume skin is purchased. However, in another exemplary embodiment, when a costume skin is purchased, the skin corresponding character for the costume skin may be given only in the case where the user does not possess the skin corresponding character.

In the above exemplary embodiment, the case where data of a costume skin can be acquired by purchase of the costume skin, has been shown. Instead, the configuration may be made such that the data itself has been acquired in advance, but usage of the data is restricted until the costume skin is purchased. That is, while the data of the costume skin is possessed, the data is locked so as not to be used, and the data is unlocked by "purchase of the costume skin", for example. In other words, the "purchase of the costume skin" in this case corresponds to purchasing availability/usage right for the data of the costume skin.

Regarding a method for acquiring a costume skin, the case of "purchasing" in a state of signing up for the subscription service has been shown in the above example. Besides, in another exemplary embodiment, as a bonus by signing up for the subscription service, a predetermined costume skin may be distributed to the user at the same time as the signing up. In addition, during a period in which the user signs up for the subscription service, different costume skins may be distributed regularly (e.g., on a seasonal basis). Besides, a predetermined costume skin may be given to the user, as an award when the user finishes an event in the game.

In the above example, it is assumed that a predetermined charge is paid in "purchase". Instead, a costume skin may be allowed to be acquired by using a paid item.

Regarding the process for changing the outer appearance image, in the above example, the individual characters possessed by the user are displayed on the list screen in FIG. 5. Instead, in another exemplary embodiment, icon images of same-name characters that are not possessed by the user but for which costume skins are provided, may also be displayed on the list screen. In this case, although such characters are displayed, the display manner may be made different from the characters possessed by the user (e.g., grayed out), so that a selecting operation thereon is not accepted. Thus, it is possible to cause the user to recognize that there are characters that are not possessed by the user and for which costume skins are provided. This can enhance the user's interest in the game.

In the above exemplary embodiment, after the outer appearance images of the skin corresponding characters are changed at the same time as purchase of a costume skin, in the case of returning to the original outer appearance image, the outer appearance image is returned on an individual character basis. Without limitation thereto, in another exemplary embodiment, the configuration may be made so as to make it possible to return all the skin corresponding characters corresponding to a predetermined costume skin to the original outer appearance image at one time.

In the above exemplary embodiment, the terminal-side user data 602 (the possessed character data 533 included therein) is stored in the processing terminal 102, whereby a plurality of same-name characters having the same outer appearance image are managed individually. In another exemplary embodiment, instead of the configuration in which data is (directly) stored in the processing terminal 102, the outer appearance images of a plurality of same-name characters may be individually displayed on the basis of data received from the server 101 in the processing terminal 102, whereby a plurality of same-name characters having the same outer appearance image may be individually managed.

A main unit for executing the process as described above is not limited to the above. For example, in the above processing system, the system on the server 101 side may be configured from a plurality of processing apparatuses, and the process to be executed on the server 101 side may be executed by being shared among the plurality of processing apparatuses. Of the above sequential processes executed by the processing terminal 102, a major process may be executed by the server-side apparatus, and a partial process may be executed by the processing terminal 102. A so-called cloud gaming configuration may be employed. For example, a configuration may be made such that the processing terminal 102 transmits the operation data 505 indicating a user's operation to the server 101, various game processes are executed in the server 101, and a result of the execution may be delivered as a video and a sound by streaming to the processing terminal 102. In contrast, the process as described above may be executed by a single processing apparatus alone.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. A processing system including at least one processor, the at least one processor included in the processing system executing, alone or in coordination, processing of:

managing a plurality of characters which are possessed by a user and with which outer appearance images representing outer appearances and game parameters used in a game are respectively associated, and even when a plurality of characters for which a same outer appearance image is set are included in the plurality of characters, individually managing the plurality of characters having the same outer appearance image;

executing the game using at least any of the plurality of characters possessed by the user;

for a specific character designated by the user among specific characters for which a change allowing condition for changing the outer appearance image is satisfied among the plurality of characters possessed by the user, selecting, on the basis of an instruction from the user, whether to apply a first image set in advance in association with the specific character or a second image that has become selectable by the change allowing condition being satisfied, and changing the outer appearance images of all the designated specific characters that are possessed, to the selected image;

when the change allowing condition is satisfied for any of the characters, changing the game parameters of all the specific characters for which the change allowing condition is satisfied among the characters possessed by the user;

a basic parameter that is used as the game parameter and varies in accordance with a progress state of the game is set in advance for each of the characters, in changing the game parameter, adding a value to the basic parameters of all the possessed specific characters irrespective of the progress state of the game;

after the change allowing condition is satisfied, allowing the outer appearance image of the specific character for which the change allowing condition is satisfied, to be optionally changed to the first image or the second image; and not changing the game parameter between when the outer appearance image of the specific character is the first image and when the outer appearance image of the specific character is the second image.

2. The processing system according to claim 1, wherein
among the specific characters, the outer appearance image of the character that has been possessed by the user since before the change allowing condition is satisfied is also changed, and
among the specific characters, the game parameter of the character that has been possessed by the user since before the change allowing condition is satisfied is also changed.

3. The processing system according to claim 1, wherein
among the specific characters, the outer appearance image of the character newly acquired by the user after the change allowing condition is satisfied is also changed, and
among the specific characters, the game parameter of the character newly acquired by the user after the change allowing condition is satisfied is also changed.

4. The processing system according to claim 1, wherein
the processor gives a predetermined number of the specific characters to the user when the change allowing condition is satisfied.

5. A computer-readable non-transitory storage medium having stored therein a processing program to be executed by at least one processor included in a processing system, the processing program causing the at least one processor to:
manage a plurality of characters which are possessed by a user and with which outer appearance images representing outer appearances and game parameters used in a game are respectively associated, and even when a plurality of characters for which a same outer appearance image is set are included in the plurality of characters, individually manage the plurality of characters having the same outer appearance image;
execute the game using at least any of the plurality of characters possessed by the user;
for a specific character designated by the user among specific characters for which a change allowing condition for changing the outer appearance image is satisfied among the plurality of characters possessed by the user, select, on the basis of an instruction from the user, whether to apply a first image set in advance in association with the specific character or a second image that has become selectable by the change allowing condition being satisfied, and change the outer appearance images of all the designated specific characters that are possessed, to the selected image;
when the change allowing condition is satisfied for any of the characters, change the game parameters of all the specific characters for which the change allowing condition is satisfied among the characters possessed by the user;
a basic parameter that is used as the game parameter and varies in accordance with a progress state of the game is set in advance for each of the characters,
in changing the game parameter, add a value to the basic parameters of all the possessed specific characters irrespective of the progress state of the game;
after the change allowing condition is satisfied, allow the outer appearance image of the specific character for which the change allowing condition is satisfied, to be optionally changed to the first image or the second image; and
not change the game parameter between when the outer appearance image of the specific character is the first image and when the outer appearance image of the specific character is the second image.

6. A processing apparatus including at least one processor, comprising:
managing a plurality of characters which are possessed by a user and with which outer appearance images representing outer appearances and game parameters used in a game are respectively associated, and even when a plurality of characters for which a same outer appearance image is set are included in the plurality of characters, individually managing the plurality of characters having the same outer appearance image;
executing the game using at least any of the plurality of characters possessed by the user;
for a specific character designated by the user among specific characters for which a change allowing condition for changing the outer appearance image is satisfied among the plurality of characters possessed by the user, selecting, on the basis of an instruction from the user, whether to apply a first image set in advance in association with the specific character or a second image that has become selectable by the change allowing condition being satisfied, and changing the outer appearance images of all the designated specific characters that are possessed, to the selected image;
when the change allowing condition is satisfied, changing the game parameter of all the characters for which the outer appearance images are allowed to be changed;
a basic parameter that is used as the game parameter and varies in accordance with a progress state of the game is set in advance for each of the characters,
in changing the game parameter, adding a value to the basic parameters of all the possessed specific characters irrespective of the progress state of the game;
after the change allowing condition is satisfied, allowing the outer appearance image of the specific character for which the change allowing condition is satisfied, to be optionally changed to the first image or the second image; and
not changing the game parameter between when the outer appearance image of the specific character is the first image and when the outer appearance image of the specific character is the second image.

7. A processing method executed by at least one processor for controlling a processing system, the processing method causing the at least one processor to:
manage a plurality of characters which are possessed by a user and with which outer appearance images representing outer appearances and game parameters used in a game are respectively associated, and even when a plurality of characters for which a same outer appearance image is set are included in the plurality of characters, individually manage the plurality of characters having the same outer appearance image;
execute the game using at least any of the plurality of characters possessed by the user;
for a specific character designated by the user among specific characters for which a change allowing condition for changing the outer appearance image is satisfied among the plurality of characters possessed by the user, select, on the basis of an instruction from the user, whether to apply a first image set in advance in association with the specific character or a second image that has become selectable by the change allowing condition being satisfied, and change the outer appearance images of all the designated specific characters that are possessed, to the selected image;
when the change allowing condition is satisfied for any of the characters, change the game parameters of all the specific characters for which the change allowing condition is satisfied among the characters possessed by the user;

a basic parameter that is used as the game parameter and varies in accordance with a progress state of the game is set in advance for each of the characters, in changing the game parameter, add a value to the basic parameters of all the possessed specific characters irrespective of the progress state of the game;

after the change allowing condition is satisfied, allow the outer appearance image of the specific character for which the change allowing condition is satisfied, to be optionally changed to the first image or the second image; and not change the game parameter between when the outer appearance image of the specific character is the first image and when the outer appearance image of the specific character is the second image.

\* \* \* \* \*